United States Patent
Lee et al.

(10) Patent No.: US 8,184,734 B2
(45) Date of Patent: May 22, 2012

(54) METHOD OF DATA TRANSMISSION IN A WIRELESS COMMUNICATION SYSTEM

(75) Inventors: Moon Il Lee, Anyang-si (KR); Bin Chul Ihm, Anyang-si (KR); Wook Bong Lee, Anyang-si (KR); Jae Won Chang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 470 days.

(21) Appl. No.: 12/312,299

(22) PCT Filed: Nov. 6, 2007

(86) PCT No.: PCT/KR2007/005577
§ 371 (c)(1),
(2), (4) Date: May 5, 2009

(87) PCT Pub. No.: WO2008/056928
PCT Pub. Date: May 15, 2008

(65) Prior Publication Data
US 2010/0027696 A1    Feb. 4, 2010

Related U.S. Application Data

(60) Provisional application No. 60/864,555, filed on Nov. 6, 2006.

(30) Foreign Application Priority Data

Jul. 30, 2007 (KR) .................... 10-2007-0076417

(51) Int. Cl.
*H04B 7/02* (2006.01)
(52) U.S. Cl. ...................................................... 375/267
(58) Field of Classification Search ............... 375/260, 375/295, 299, 304, 308, 315, 267, 279; 455/101, 455/562.1, 69
See application file for complete search history.

(56) References Cited

U.S. PATENT DOCUMENTS

| 2006/0159195 | A1 | 7/2006 | Lonescu et al. |
| 2007/0041464 | A1 | 2/2007 | Kim et al. |
| 2007/0249296 | A1* | 10/2007 | Howard et al. ............... 455/101 |
| 2011/0064156 | A1* | 3/2011 | Kim et al. ..................... 375/267 |

FOREIGN PATENT DOCUMENTS

WO    WO 2007/024913    3/2007

* cited by examiner

*Primary Examiner* — Khai Tran
(74) *Attorney, Agent, or Firm* — McKenna Long & Aldridge LLP

(57) ABSTRACT

A method for transmitting data in a wireless communication system is provided. The method includes encoding one or more input data according to a specific coding rate and modulating the input data according to a specific modulation scheme, applying virtual antenna signaling to the one or more encoded and modulated input data based on a specific spatial multiplexing rate, and performing spatial processing on the input data, to which the virtual antenna signaling has been applied, and then transmitting the input data to a receiving end.

7 Claims, 5 Drawing Sheets

METHOD OF DATA TRANSMISSION IN A WIRELESS COMMUNICATION SYSTEM

This application is a national stage entry of International Application No. PCT/KR2007/005577, filed Nov. 6, 2007, and claims benefit to U.S. Application No. 60/864,555, filed Nov. 6, 2006 and Korean Application No. 10-2007-0076417, filed on Jul. 30, 2007, each of which are hereby incorporated by reference in their entireties for all purposes as if fully set forth herein.

TECHNICAL FIELD

The present invention relates to a wireless communication system, and more particularly, to a method for transmitting data in a wireless communication system.

BACKGROUND ART

Recently, the spread of communication services, the advent of various multimedia services, the appearance of high-quality services, etc., have rapidly increased the demand for wireless communication services. To actively meet the demand, it is necessary not only to increase the capacity of the communication system but also to increase the reliability of data transmission.

As a method for increasing the communication capacity in a wireless communication environment, one may consider a method of finding a new available frequency band and a method of increasing the efficiency of given resources. One example of the latter method is a Multiple Input Multiple Output (MIMO) Antenna technology, which is under active development while drawing great attention. According to the MIMO technology, a transmitter/receiver is equipped with multiple antennas to secure a spatial region for utilization of resources to obtain a diversity gain or data is transmitted in parallel through the antennas to increase the transmission capacity.

Generally, MIMO schemes are employed to increase the reliability of the communication system or to improve the transmission efficiency and are mainly classified into three, beamforming, spatial diversity, and spatial multiplexing schemes.

In the beamforming scheme and the spatial diversity scheme using multiple transmitting antennas to increase the reliability, a single data stream is generally transmitted through multiple transmitting antennas. In the spatial multiplexing scheme used to increase the transmission efficiency, multiple data streams are simultaneously transmitted through multiple transmitting antennas.

The number of data streams simultaneously transmitted in the spatial multiplexing scheme is referred to as a spatial multiplexing rate, which must be selected appropriately according to the number of transmitting and receiving antennas and the channel states. Generally, the maximum achievable spatial multiplexing rate is limited by the lower of the number of transmitting antennas and the number of receiving antennas and a lower spatial multiplexing rate is used as the correlation between channels increases.

When the spatial multiplexing scheme is used, a virtual antenna signaling scheme can be applied to achieve a variety of benefits.

For example, if the virtual antenna signaling scheme is applied, channel environments of multiple data streams become identical, thereby making it possible to provide strong channel quality information (CQI) and to increase the reliability of data streams in bad channel conditions.

It is also possible to keep transmission power levels of physical antennas almost equal by applying the virtual antenna signaling scheme to the antennas. More specifically, physical transmitting antennas form a set to create a plurality of beams, which correspond respectively to virtual antennas. Here, different beams are created so that the same power is transmitted from all physical antennas and that the channel characteristics are maintained.

Basically, the total number of created virtual antennas indicates an available spatial diversity or spatial multiplexing rate. This number also indicates the amount of overhead required to measure spatial channels. In the following description, "Mt" represents the number of physical transmitting antennas, "Mr" represents the number of physical receiving antennas, "Me" represents the number of available virtual transmitting antennas, and "M" represents the number of simultaneously transmitted layers. Here, the layers are transmission symbols that have been independently encoded and modulated.

On the other hand, preceding is used as a spatial processing scheme to increase the reliability or transmission efficiency of communication systems. The preceding scheme can be used in a multi-antenna system, regardless of the spatial multiplexing rate. The precoding scheme is typically used to increase the signal to noise ratio (SNR) of channels. Generally, the transmitting end transmits data after multiplying it by a matrix or vector optimal for the current channel environment. For the matrix or vector for multiplication, the transmitting end can receive and use a matrix or vector fed back from a receiving end or can calculate and use an optimal matrix or vector if the transmitting end can determine downlink channel information.

This precoding scheme can be used by integrating it with the virtual antenna signaling scheme. However, the integration will alter the preceding matrix or vector and significantly reduce the system performance unless it creates an appropriate integrated form. The following is an example of this.

FIG. 1 illustrates a conventional structure to which both the preceding scheme and the virtual antenna signaling scheme are applied.

This structure uses a method in which the virtual antenna signaling scheme is applied after the precoding scheme is applied. Specifically, after a preceding matrix is used to increase the average channel SNR, respective data symbols of streams are mixed through virtual antenna signaling before transmission to allow the data streams to undergo the same channel, thereby achieving a virtual antenna signaling gain.

However, this method may reduce the efficiency of the optimal preceding matrix due to the virtual antenna signaling since the virtual antenna signaling is applied after preceding.

DISCLOSURE

Technical Problem

An object of the present invention devised to solve the problem lies on providing a method for transmitting data in a wireless communication system, wherein a virtual antenna signaling scheme is integrated with a preceding scheme.

Technical Solution

The object of the present invention can be achieved by providing a data transmission method in which a virtual antenna signaling scheme is integrated with a phase-shift-diversity-based precoding scheme.

In another aspect of the present invention, provided herein is a method for transmitting data in a wireless communication system, the method comprising encoding one or more input data according to a specific coding rate and modulating the input data according to a specific modulation scheme, applying virtual antenna signaling to the one or more encoded and modulated input data based on a specific spatial multiplexing rate, performing spatial processing on the input data, to which the virtual antenna signaling has been applied, and transmitting the input data to a receiving end.

And, through the virtual antenna signaling, each data symbol of the one or more encoded and modulated input data may be mapped to one or more virtual antennas In another aspect of the present invention, the method further may include receiving virtual-antenna-related information, and the virtual-antenna-related information may include at least one of the spatial multiplexing rate, the coding rate, and the modulation scheme.

In another aspect of the present invention, the virtual-antenna-related information further includes a preceding matrix information and the spatial processing includes using the precoding matrix information at least partially fed back from the receiving end.

In another aspect of the present invention, the spatial processing may include using a preceding matrix predefined according to the spatial multiplexing rate.

In another aspect of the present invention, the precoding matrix may include product of a diagonal matrix for achieving phase-shift diversity and a unitary matrix for spatial multiplexing, wherein the precoding matrix may be:

$$P_{N_t \times R}^k = \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & \cdots & e^{j\theta_{N_t} k} \end{pmatrix} U_{N_t \times R},$$

where $P_{N_t \times R}^k$ is a generalized phase-shift-based precoding matrix for a kth subcarrier in a multi-antenna system with a spatial multiplexing rate of R and $N_t$ transmitting antennas, $U_{N_t \times R}$ is a unitary matrix that satisfies "$U_{N_t \times R}^H \times U_{N_t \times R} = II_{R \times R}$", and a phase angle $\theta_i(t)$ (i=1, ..., $N_t$) is such that $\theta_i = -2\pi/N_{ff} \cdot \tau_i$ for a delay value $\tau_i(t)$ (i=1, ..., $N_t$), where $N_{ff}$ denotes the number of subcarriers of a corresponding OFDM signal.

In another aspect of the present invention, the virtual-antenna-related information may include at least one of preceding matrix index, column subset index, and channel quality information.

In another aspect of the present invention, the virtual-antenna-related information may be fed back from the receiving end includes unitary matrix information and the spatial processing may use a unitary matrix.

In another aspect of the present invention, the spatial processing may use a unitary matrix predefined according to the spatial multiplexing rate.

In another aspect of the present invention, the virtual-antenna-related information fed back from the receiving end may include a phase value of each antenna of a diagonal matrix for achieving phase-shift diversity.

In another aspect of the present invention, the spatial processing may use a phase value of each antenna of a diagonal matrix for achieving phase-shift diversity and the diagonal matrix is predefined according to the spatial multiplexing rate.

Advantageous Effects

The method for transmitting data in a wireless communication system using a virtual antenna signaling scheme according to the present invention has a variety of advantages including the following.

First, in time-varying channel environments, the method can increase the accuracy of channel quality (or state) information and adaptively cope with channel changes, thereby achieving an overall performance improvement. The virtual antenna scheme allows the base station to efficiently appear to the MIMO user as if it has Me virtual transmitting antennas rather than Mt real transmitting antennas, where Me≦Mt. This results in a reduction in the negative influence on channel measurement.

Second, phase-shift-based precoding is used as spatial processing, thereby increasing the average channel SNR.

Third, the phase-shift-based precoding is integrated with the virtual antenna signaling scheme, thereby not only increasing the average channel SNR but also reducing the overhead of feedback from the receiver in time-varying channel environments.

MODE FOR INVENTION

The above and other configurations, operations, and features of the present invention will be easily understood from the preferred embodiments of the invention described below with reference to the accompanying drawings. The following detailed description given with reference to the accompanying drawings is intended to explain exemplary embodiments of the invention, rather than to illustrate the only embodiment that can be provided according to the invention.

The following technology can be used in various communication systems using multiple antennas. Communication systems are widely installed to provide various communication services such as voice and packet data services. This technology can be used for downlink or uplink. The downlink means communication from a base station to a mobile station and the uplink means communication from a mobile station to a base station. The base station is generally a stationary point, which communicates with mobile stations, and includes not only a physical transmitting end but also an upper layer. Each mobile station may be stationary or mobile.

Figure 1:
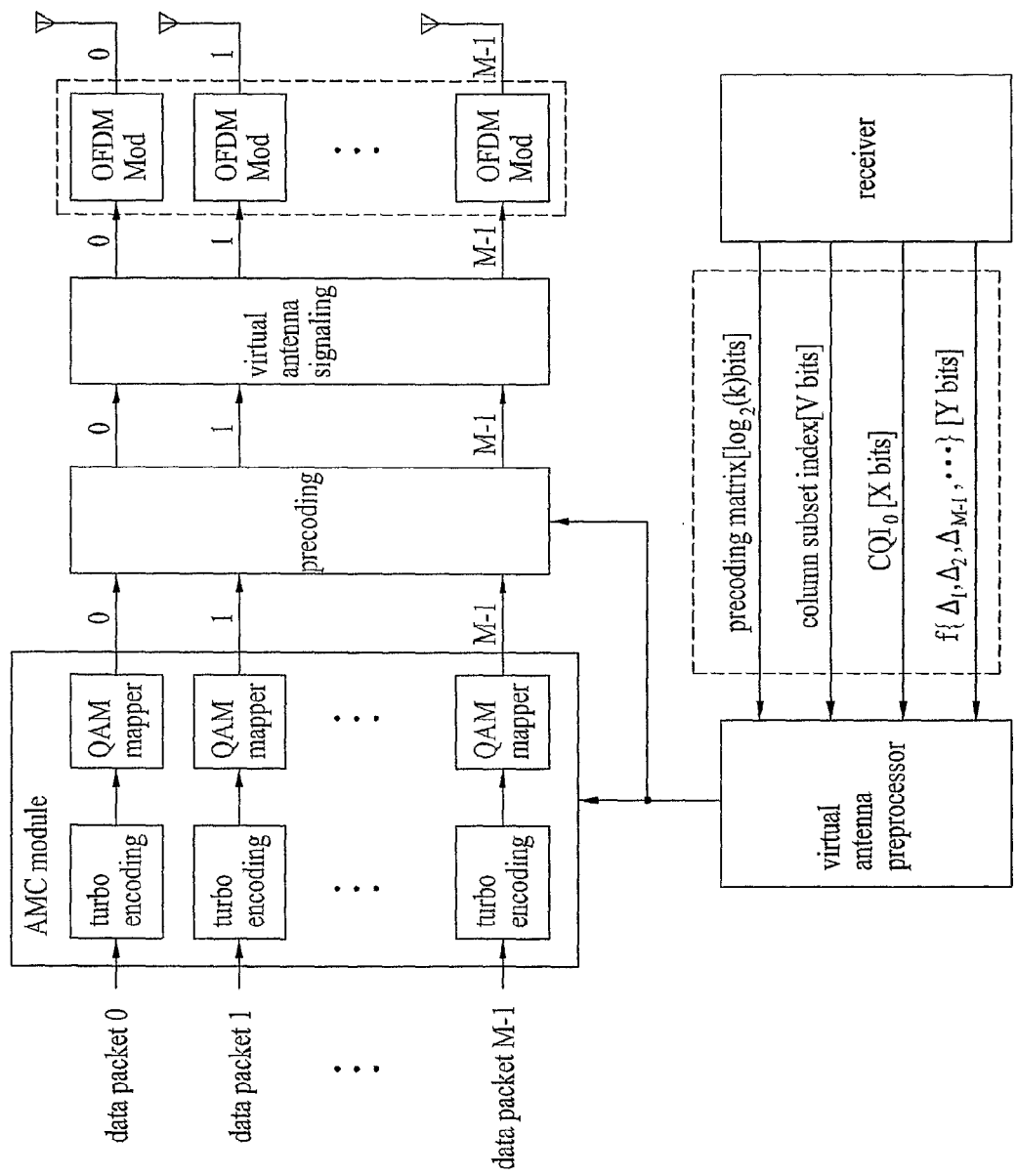
FIG. 1 illustrates a conventional structure of a transmitting end of a multi-antenna system with preceding scheme integrated with a virtual antenna signaling scheme.
Figure 2:
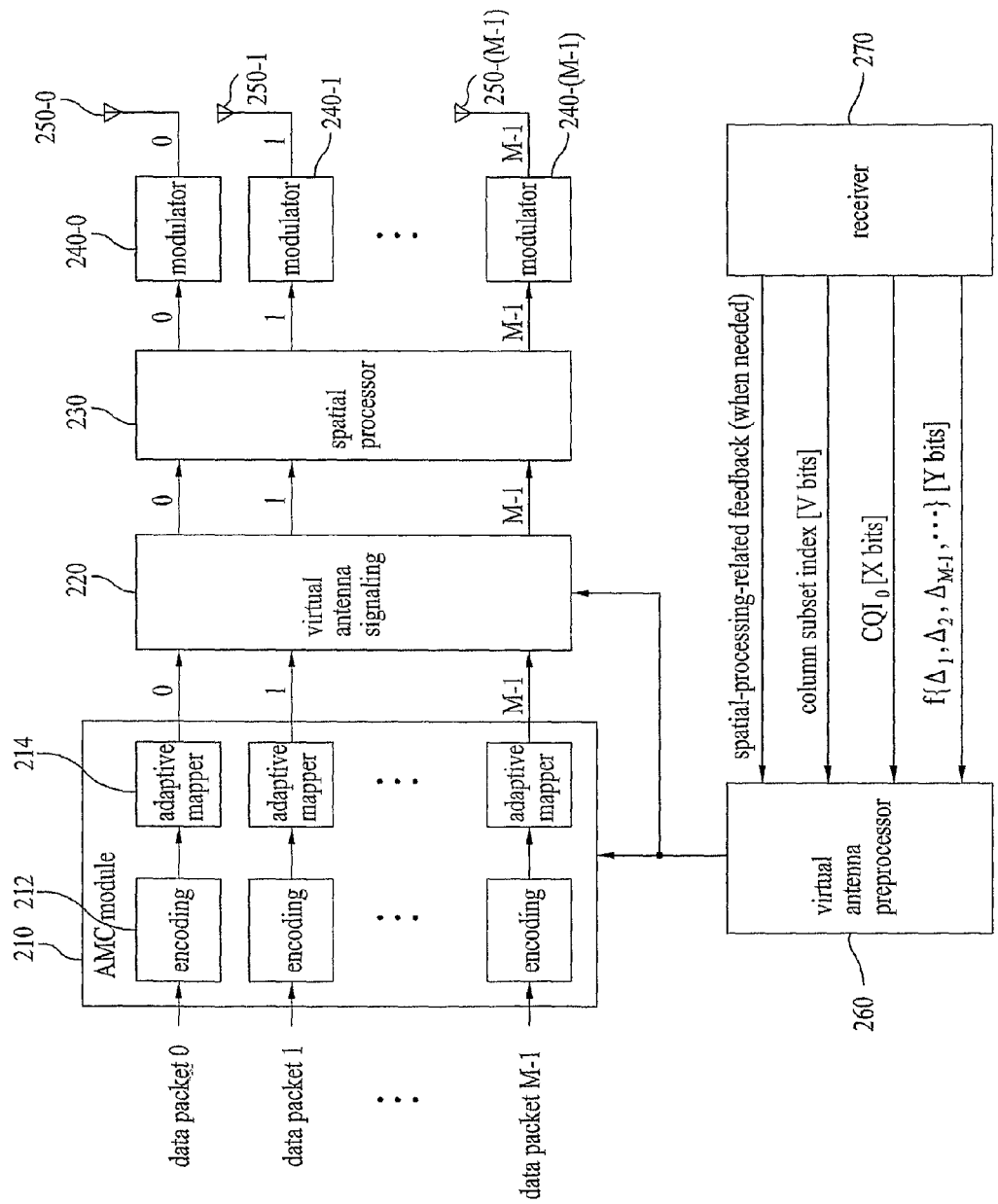
FIG. 2 illustrates a structure of a transmitting end of a multi-antenna system with spatial processing integrated with the virtual antenna signaling scheme according to an embodiment of the invention.

FIG. 2 shows a structure of a transmitting end of a multi-antenna system with spatial processing integrated with the virtual antenna signaling scheme according to an embodiment of the invention.

An Adaptive Modulation and Coding (AMC) module 210 functions to adaptively apply modulation and encoding schemes, which a virtual antenna preprocessor 260 determines using channel quality information fed back from a receiver 270, to each input data according to channel states.

Each encoder 212 receives and encodes a stream of information bits to produce encoded data according to a predetermined coding scheme. The information bits may include text, audio, video, or other data.

The encoder 212 can add error check bits such as cyclic redundancy check (CRC) bits and additional codes for error correction to the information bits. The error correction codes may be turbo codes. The turbo codes are systematic codes that incorporate information bits as systematic bits. Without being limited to the turbo codes, the error correction codes may include low density parity check (LDPC), convolution, and RC codes, which are generally used, and any other codes based on these coding schemes. The encoder 212 can adaptively use other error correction codes according to a determination made at the virtual antenna preprocessor 260 and channel quality information fed back from the receiver 270.

Each adaptive mapper 214 modulates the encoded data according to a predetermined modulation scheme to provide modulated symbols. That is, each adaptive mapper 214 maps the encoded data to a symbol representing a location on an amplitude and phase constellation.

Here, there are no limitations on the modulation scheme, which may be m-quadrature phase shift keying (m-PSK) or m-quadrature amplitude modulation (m-QAM). For example, the m-PSK may be BPSK, QPSK, or 8-PSK and the m-QAM may be 16-QAM, 64-QAM, and 256-QAM. In the case of the QPSK, the adaptive mapper 214 maps the encoded data to modulated symbols, each consisting of 2 bits. In the case of the 16-QAM, the adaptive mapper 214 maps the encoded data to modulated symbols, each consisting of 4 bits.

A virtual antenna signaling module 220 functions to mix together modulated symbols in multiple code words (MCWs) which are data streams output from the AMC module 210. Here, the data streams are streams of modulated symbols output respectively from the adaptive mapper 214 corresponding to the encoder 212 in the AMC module 210.

Figure 3:
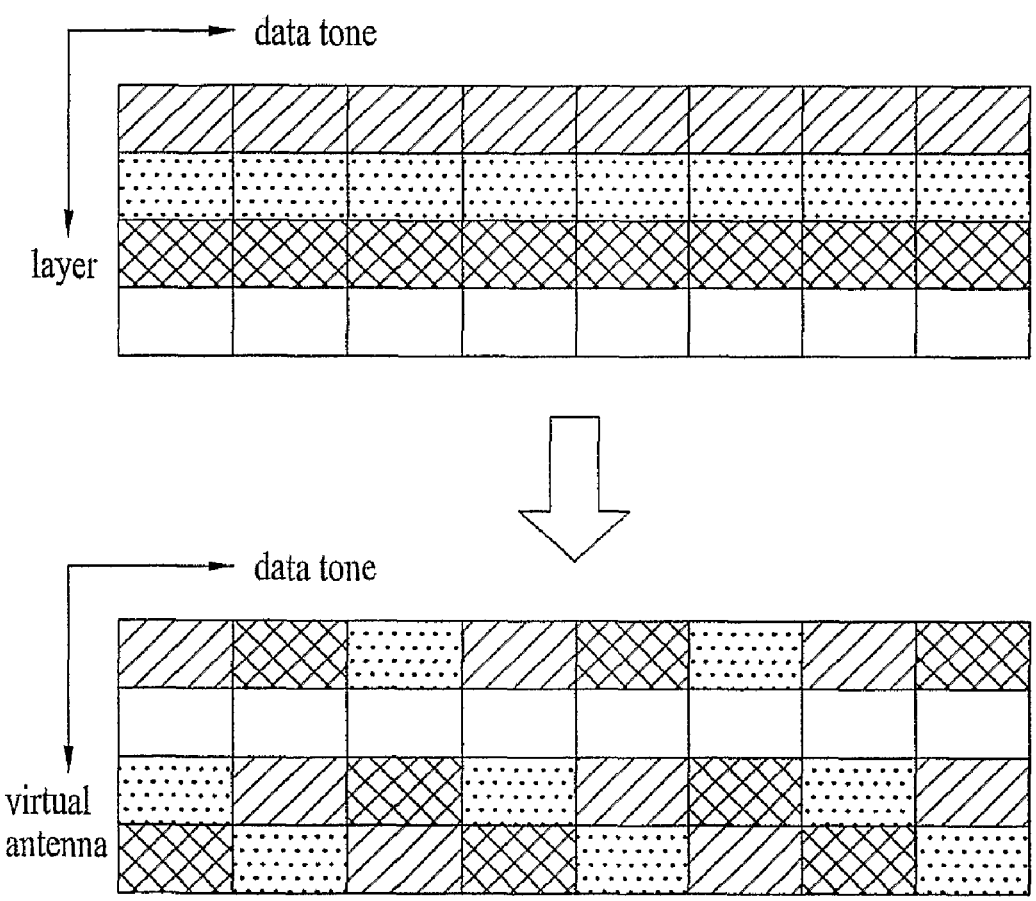
FIG. 3 illustrates an exemplary method for mapping transmission layers to virtual antennas when the virtual antennas are applied according to the embodiment of the invention.
Figure 4:
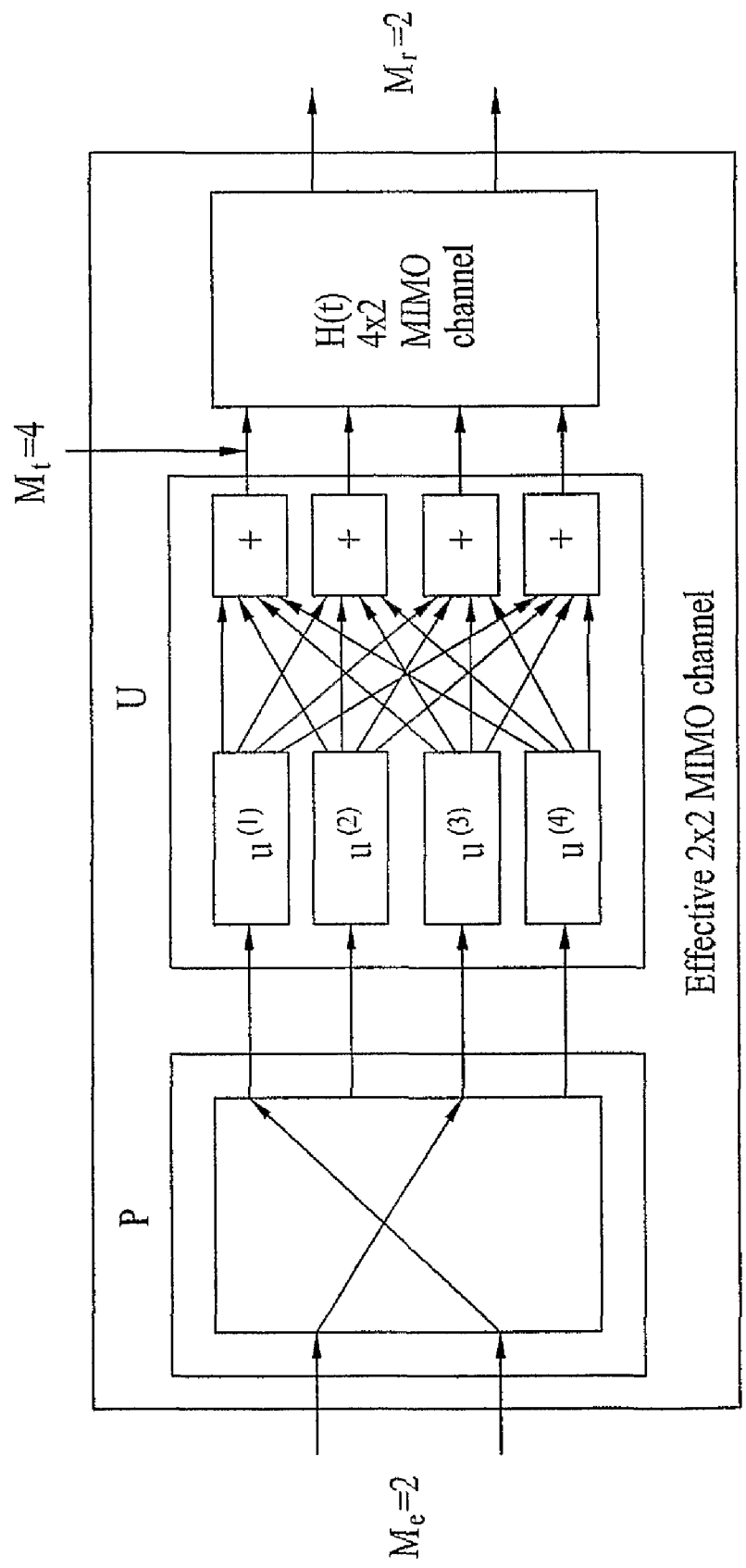
FIG. 4 illustrates an example of virtual antenna mapping according to the embodiment of the invention.

FIG. 3 illustrates an exemplary method for mapping transmission layers to virtual antennas when the virtual antennas are applied according to the embodiment of the invention.

Specifically, FIG. 3 illustrates example functions of the virtual antenna signaling module 220 to perform virtual antenna selection and virtual antenna permutation that is, an example method to map transmission layers corresponding to a plurality of data streams to virtual antennas.

In this example, 3 layers {0, 1, 2} are mapped to 3 virtual antennas {0, 2, 3}. Virtual antenna permutation between selected virtual antennas employs a simple cycling scheme for symmetric permutation or uniform permutation.

Reference will now be made in detail to an embodiment of the virtual antenna mapping method of the virtual antenna signaling module 220 to allow R data streams to have the same channel condition. Here, let x(k) be an input vector of the virtual antenna signaling module 220 for a kth subcarrier and x̃(k) be an output vector of the virtual antenna signaling module 220 for the kth-subcarrier. Then, x̃(k) can be represented as follows.

$$\tilde{x}(k) = V_{R \times R}(k) x(k) \quad \text{[Equation 1]}$$

Here, $V_{R \times R}(k)$ is a virtual antenna signaling matrix. In an embodiment, $V_{R \times R}(k)$ can be constructed as follows when the spatial multiplexing rate is 2.

$$V_{R \times R}(k) = \begin{cases} \begin{pmatrix} 1 & 0 \\ 0 & 1 \end{pmatrix}, & \text{if } k \text{ is odd} \\ \begin{pmatrix} 0 & 1 \\ 1 & 0 \end{pmatrix}, & \text{if } k \text{ is even} \end{cases} \quad \text{[Equation 2]}$$

As can be seen from the above description, the virtual antenna signaling scheme can be simply implemented by multiplying by a rotation matrix for rotating each data stream per a subcarrier.

The virtual antenna preprocessor 260 performs virtual antenna subset selection and spatial multiplexing rate prediction. The base station signals the possibility of use of the virtual antenna subset selection, taking into consideration the structure of the receiver, the number of antennas of the base station and the mobile station, long-term SNR, spatial correlation, and other channel conditions. Generally, the virtual antenna subset selection does not significantly increase the throughput performance of a MIMO system having an SIC receiver except when the number of antennas of the mobile station is less than Me or the mobile station is negatively affected by a high spatial correlation or a low SNR.

When the virtual antenna subset selection cannot be used as described above, the mobile station does not need to report a desirable virtual antenna subset and the base station uses all virtual antennas (i.e., M=Me). Here, the constellation size and the coding rate of each of the M transmission layers are adaptively changed according to channel conditions. This adaptive change is performed at the AMC processing module 210.

If the virtual antenna subset selection is usable, the mobile station activates a selection algorithm for determining M and the desirable subset.

For example, the selection algorithm calculates a sum capacity achievable by each subset constructed according to predetermined rules and then selects a subset providing the highest sum capacity.

Further, the mobile station can assume that the total transmission power is uniformly allocated to virtual antennas in the selected subset. In addition, the mobile station can calculate M CQI values of each transmission layer and selectively apply differential encoding to the CQI values in order to reduce feedback overhead and then notify the base station of this. The base station can control transmission power of each transmission layer based on both the number of the selected virtual antennas and a power control strategy, and then activate rate prediction to select the modulation scheme and the coding rate of each transmission layer.

A spatial processor 230 processes data passed through the virtual antenna signaling module so that the data can be transmitted through multiple transmitting antennas 250-0, . . . , 250-(M−1).

The spatial processor 230 in the invention can select and use one of all types of multi-antenna schemes including precoding scheme. Examples of the multi-antenna scheme include an antenna selection scheme, in which some of the transmitting antennas, rather than all of them, are used to transmit data in order to prevent a reduction in the performance of the MIMO system due to spatial correlation between the antennas in the MIMO system, a mode switching scheme, in which one of a spatial multiplexing scheme or a transmission diversity scheme is selected and used according to channel states in an open loop transmission scheme, an combination of antenna selection scheme and mode switching scheme, in which the antenna selection and mode switching schemes are integrated to achieve an improvement in the performance, compared to when each scheme is individually used, a beamforming scheme which is effective for use when the interval between antennas is small, and a Multiple Input Multiple Output (MIMO) antenna scheme in which multiple users are considered.

The following is a description of an example in which a preceding scheme is used as the multi-antenna scheme. Although any type of precoding can be used, phase-shift-based precoding expressed below in Equation 3 can be used in an embodiment of the invention.

Reference will now be made in detail to the phase-shift-based precoding scheme in the embodiment described below.

Generation of Phase-Shift-Based Precoding Matrix

The phase-shift-based preceding scheme transmits all data streams through all antennas after multiplying the data streams by different phase sequences.

Generally, if the phase sequence is generated using a low cyclic delay value, then frequency selectivity occurs in channels as seen from the receiver and the channel size increases or decreases according to the frequency.

Generally, the transmitter obtains a scheduling gain by allocating the user mobile station to a part, which provides a good channel state due to an increase in the level of the corresponding frequency, of a fluctuating frequency band according to the relatively low cyclic delay value. Here, a phase-shift-based preceding matrix is used in order to apply a uniformly increasing or decreasing cyclic delay value to each antenna.

The phase-shift-based preceding scheme can be mathematically expressed as follows.

$$P^k_{N_t \times R} = \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & \cdots & e^{j\theta_{N_t} k} \end{pmatrix} U_{N_t \times R},$$  [Equation 3]

where $P^k_{N_t \times R}$ is a generalized phase-shift-based precoding matrix for the kth subcarrier of a MIMO-OFDM signal with a spatial multiplexing rate of R and $N_t$ transmitting antennas and $U_{N_t \times R}$ is a unitary matrix that satisfies "$U_{N_t \times R}^H \times U_{N_t \times R} = II_{R \times R}$", which is used to convert the phase-shift matrix into a unitary matrix. A phase angle $\theta_i(t)$ (i=1, . . . , $N_t$) in Equation 3 can be obtained according to a delay value $\tau_i(t)$ (i=1, . . . , $N_t$) as expressed in Equation 4.

$$\theta_i = -2\pi/N_{fft} \tau_i,$$  [Equation 4]

where $N_{fft}$ denotes the number of subcarriers of the OFDM signal.

A signal to which the phase-shift-based preceding has been applied can be expressed as in Equation 5.

$$s(k) = \underbrace{D(k)U(k)}_{P^k_{N_t \times R}} x(k),$$  [Mathematical Expression 5]

In Equation 4, "x(k)" denotes an input signal vector of the kth subcarrier of a transmitter which uses the phase-shift-based precoding of the above Equation 3 and "s(k)" denotes a signal vector of the kth subcarrier to which the phase-shift-based precoding has been applied. And "D(k)" denotes a phase-shift diagonal matrix used for the kth subcarrier, which can be expressed as in Equation 6.

$$D(k) = \begin{pmatrix} e^{j\theta_1 k} & 0 & \cdots & 0 \\ 0 & e^{j\theta_2 k} & \cdots & 0 \\ \vdots & \vdots & \ddots & \vdots \\ 0 & 0 & \cdots & e^{j\theta_{N_t} k} \end{pmatrix},$$  [Equation 6]

where "U(k)" denotes a unitary matrix used for the kth subcarrier, which can be expressed by the product of one or more unitary matrices. For the matrix "U(k)", the transmitter can use a matrix fed back from the receiver and can use a matrix predefined for both the transmitter and receiver. A phase angle $\theta_i(t)$ (i=1, . . . , $N_t$) in Equation 6 can be obtained according to a delay value $\tau_i(t)$ (i=1, . . . , $N_t$) as expressed in Equation 4.

Combination of Virtual Antenna Signaling Scheme and Phase-Shift-Based Precoding Scheme A variety of benefits can be achieved if the virtual antenna signaling module 220 is provided to use the virtual antenna signaling scheme while the phase-shift-based precoding scheme is used for the spatial processor 230.

That is, by applying the phase-shift-based preceding scheme to change multi-antenna channels into channels with an increased SINR or increased diversity gain and also by applying the virtual antenna signaling scheme to reduce the amount of channel quality information (CQI) that the receiver needs to feed back to the transmitter, it is possible to improve the performance while reducing the feedback overhead.

Reference will now be made in detail to an embodiment of the operation and the configuration method of the combination of virtual antenna signaling scheme and the phase-shift-based preceding scheme when a transmitter having $N_t$ physical transmitting antennas has R data streams or transmission layers. We can obtain Mathematical Equation 7.

$$y(k) = H(k)s(k) + n(k),$$  [Equation 7]

IN Equation 7, "H(k)" is a multi-antenna channel for a kth subcarrier, "y(k)" is a receiving vector for the kth subcarrier, and "s(k)" is a signal vector for the kth subcarrier transmitted through $N_t$ physical transmitting antennas. And, n(k) denotes noise and interference components added at the receiver.

The transmission signal vector s(k) in Equation 7 is constructed as expressed in Equation 8.

$$s(k) = \underbrace{D(k)U(k)}_{P^k_{N_t \times R}} \underbrace{V(k)x(k)}_{\tilde{x}(k)},$$  [Equation 8]

IN Equation 8, x(k) is an input vector of the virtual antenna signaling module for the kth subcarrier, $\tilde{x}(k)$ is an output vector of the virtual antenna signaling module for the kth subcarrier, and V(k) is a matrix to mix multiple data streams on a subcarrier-by-subcarrier basis.

Figure 5:
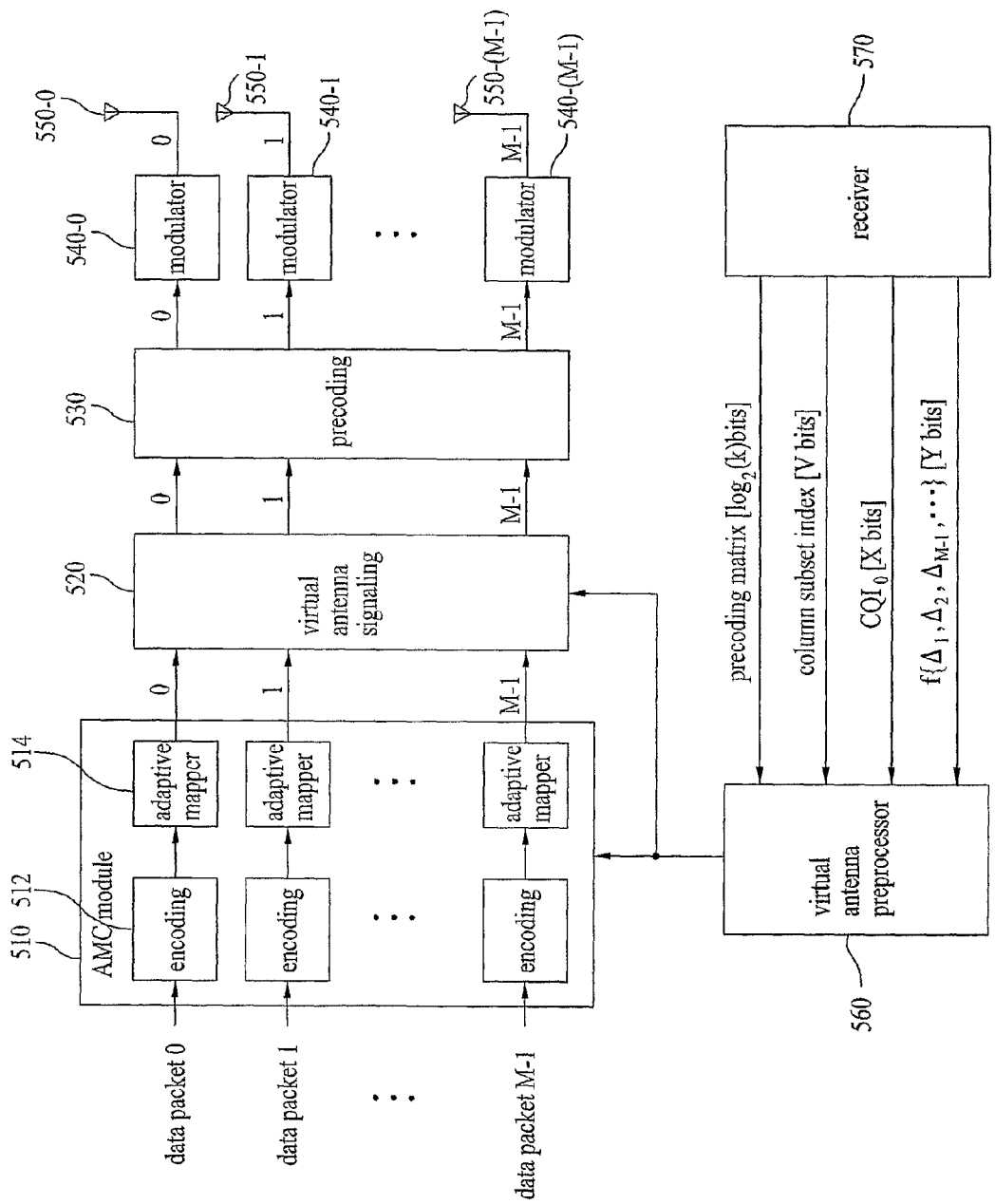
FIG. 5 illustrates a structure of a transmitting end of a multi-antenna system using preceding scheme for spatial processing and a virtual antenna signaling scheme according to an embodiment of the invention.

FIG. 5 illustrates a structure of a transmitting end of a multi-antenna system using preceding scheme for spatial processing and a virtual antenna signaling scheme according to an embodiment of the invention.

FIG. 5 shows how the preceding scheme is applied to the spatial processor 230 in FIG. 2 according to the embodiment of the invention.

When compared to FIG. 2, precoding information is added to information fed back from the receiver. The mobile station can select the index of a desirable virtual antenna subset and then feed it back to the base station using Mc bits which can be reduced if the base station limits available subsets of virtual antennas.

For example, the selection algorithm calculates a sum capacity achievable by each subset constructed according to predetermined rules and then selects a subset providing the highest sum capacity. Further, the mobile station can assume that the total transmission power is uniformly allocated to virtual antennas in the selected subset.

When the system spatially allocates wireless resources to multiple mobile stations, each mobile station can feed a precoding matrix and a column subset, instead of the virtual antenna subset, back to the system.

Modulators 540 modulate transmission symbols output from a spatial processor according to a multiple access modulation scheme and transmit the modulated symbols through respective antennas 550-1, ... 550-(M−1). Here, there are no limitations on the multiple access modulation scheme, which may be a single carrier modulation scheme such as the well-known CDMA or a multicarrier modulation scheme such as OFDM.

In downlink, the receiver 570 is an uplink receiver of the base station. In uplink, the receiver 570 is a downlink receiver of the mobile station.

Although the above method is applied to a multiple code words (MCW) scheme in which M input data are individually encoded and modulated, the method can also be applied to a single code word (SCW) scheme in which single data is input. The SCW scheme is based on the same principle as that for the MCW scheme in which multiple code words are input, except that, in the SCW scheme, single encoding and spatial multiplexing rate control are applied in the same manner to all selected virtual antennas to reduce CQI, ACK/NACK feedback overhead, downlink control overhead, and complexity of the mobile station receiver and also to simplify the HARQ operation. A linear minimum mean squared error (MMSE) spatial equalizer is considered as a basic SCW MIMO receiver and an improved receiver based on more complex, iterative demodulation and decoding can be employed to increase the performance.

According to the invention, when there are a large number of mobile stations which request a smaller number of data streams than Mc, the base station can maximize the throughput of the system using a spatial multi-user MIMO (MU-MIMO) scheduling operation which is to schedule multiple mobile stations with the same time and frequency resources. Both the MCW MIMO and SCW MIMO schemes can support the spatial MU-MIMO scheduling operation using feedback information of a column subset and a desirable virtual antenna subset or a desirable precoding matrix.

If the above system operates in the MU-MIMO mode, an efficient SINR calculation method for CQI feedback of the mobile station needs to be modified accordingly. Mobile stations to be scheduled at the same time must be carefully selected to reduce interference between the mobile stations in order to prevent a serious reduction in the performance of each mobile station. The MU-MIMO provides the greatest benefit when there are a large number of mobile stations with a smaller number of receiving antennas than Mc (for example with four transmitting antennas at the base station and two reception antennas at the mobile station). Therefore, it is preferable that user selection based on a precoding matrix capable of supporting such asymmetric transmitting and receiving antennas be used in the SDMA operation.

The part of each of FIGS. 2 and 5, excluding the receiver (denoted by "270" in FIG. 2 and "570" in FIG. 5) is the transmitter. In the downlink, the transmitter may be a part of the base station and the receiver 270 or 570 may be a part of the mobile station. Similarly, in the uplink, the transmitter may be a part of the mobile station and the receiver 270 or 570 may be a part of the base station.

Those skilled in the art will appreciate that the present invention may be embodied in other specific forms than those set forth herein without departing from the spirit and essential characteristics of the invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

The invention claimed is:

1. A method for transmitting data in a wireless communication system, the method comprising:

encoding input data to output a codeword;

modulating the codeword to output a modulated symbol stream;

mapping each symbol of the modulated symbol stream to one or more rows of an input vector to a precoder based on a specific spatial multiplexing rate;

precoding the input vector to the precoder to output a precoded vector using a phase-shift-based precoding matrix of:

$$P_{N_t \times R}^k = \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & \cdots & e^{j\theta_{N_t} k} \end{pmatrix} U_{N_t \times R},$$

wherein $P_{N_t \times R}^k$ is the phase-shift-based precoding matrix for a $k^{th}$ subcarrier in a multi-antenna system with the spatial multiplexing rate of R and $N_t$ transmitting antennas, $U_{N_t \times R}$ is a unitary matrix that satisfies "$U_{N_t \times R}^H \times U_{N_t \times R} = I_{R \times R}$"; and transmitting symbols of the precoded vector to a receiving end.

2. The method according to claim 1, wherein virtual-antenna-related information is fed back from the receiving end and the virtual-antenna-related information includes the specific spatial multiplexing rate.

3. The method according to claim 2, wherein the virtual-antenna-related information further includes a precoding matrix information to be used by the precoder.

4. The method according to claim 3, wherein a phase angle $\theta_i(t)(i=1, \ldots, N_t)$ is such that $\theta_i = -2\pi/N_{fft} \cdot \tau_i$, for a delay value $\tau_i(t)(i=1, \ldots, N_t)$, where $N_{fft}$ denotes the number of subcarriers of a corresponding OFDM signal.

5. The method according to claim 2 wherein the virtual-antenna-related information fed back from the receiving end further includes unitary matrix information.

6. The method according to claim 1, wherein the precoder uses a unitary matrix predefined according to the spatial multiplexing rate.

7. The method according to claim 1, wherein a diagonal matrix is predefined according to the spatial multiplexing rate.

* * * * *